United States Patent
Mueller et al.

(10) Patent No.: US 11,176,612 B2
(45) Date of Patent: Nov. 16, 2021

(54) UNCERTAINTY-FLEXIBILITY MATCHING ENGINE FOR INTER-TEMPORAL ELECTRIC ENERGY PRODUCTS

(71) Applicant: International Business Machines Corporation, Armonk, NY (US)

(72) Inventors: Fabian Mueller, Wiedikon (CH); Olle Sundstroem, Thalwil (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/710,175

(22) Filed: Dec. 11, 2019

(65) Prior Publication Data

US 2020/0111164 A1    Apr. 9, 2020

Related U.S. Application Data

(62) Division of application No. 15/454,124, filed on Mar. 9, 2017, now Pat. No. 10,559,035.

(51) Int. Cl.
G06Q 50/06 (2012.01)
G06Q 40/04 (2012.01)

(52) U.S. Cl.
CPC ............. G06Q 40/04 (2013.01); G06Q 50/06 (2013.01); *Y04S 50/00* (2013.01)

(58) Field of Classification Search
CPC .................................. G06Q 40/04; G06Q 50/06
See application file for complete search history.

(56) References Cited

U.S. PATENT DOCUMENTS

| | | | |
|---|---|---|---|
| 6,473,744 B1* | 10/2002 | Tuck | G06Q 50/06 705/412 |
| 8,626,353 B2 | 1/2014 | Ghosh et al. | |
| 8,731,732 B2 | 5/2014 | Klein | |
| 9,188,109 B2 | 11/2015 | Lazaris | |
| 2009/0216387 A1 | 8/2009 | Klein | |
| 2013/0226360 A1 | 8/2013 | Wilkins et al. | |
| 2014/0277808 A1 | 9/2014 | Irisarri et al. | |

(Continued)

FOREIGN PATENT DOCUMENTS

| | | |
|---|---|---|
| CN | 101820172 A | 9/2010 |
| CN | 105006843 A | 10/2015 |
| CN | 105322535 A | 2/2016 |
| JP | 2011234558 A | 11/2011 |

OTHER PUBLICATIONS

D. T. Nguyen and L. B. Le, "Optimal Bidding Strategy for Microgrids Considering Renewable Energy and Building Thermal Dynamics," in IEEE Transactions on Smart Grid, vol. 5, No. 4, pp. 1608-1620, Jul. 2014, doi: 10.1109/TSG.2014.2313612. (Year: 2014).*

(Continued)

*Primary Examiner* — Daniel Cavallari
(74) *Attorney, Agent, or Firm* — Harrington & Smith

(57) ABSTRACT

Exemplary embodiments relate to a matching engine for the coordination of electric energy production and consumption, in particular in the presence of uncertainty. The engine provides matching based on uncertainty and flexibility in the electric supply and demand chains. The system can use quantified characterizations of uncertainty and flexibility provided by performance measurements of the elements in the chain.

20 Claims, 6 Drawing Sheets

(56) References Cited

U.S. PATENT DOCUMENTS

2015/0213466 A1     7/2015    Mirzazad Barijough et al.
2016/0189298 A1*   6/2016    Tokunaga ............... H02J 3/383
                                                                        705/37

OTHER PUBLICATIONS

J. N. Swisher, "The Role of Demand-Side Resources in Integration of Renewable Power", ACEEE Summer Study on Energy Efficiency in Buildings, Aug. 12-17, 2012, whole document (15 pages).
Ju, Anne, "Adding renewable energy to power grid requires flexibility", Cornell Chronicle, Aug. 5, 2016, 4 pgs.
J.K. Kok, et al., "Powermatcher: Multiagent Control in the Electricity Infrastructure", AAMAS'05 Utrecht, Netherlands, Jul. 25-29, 2005; whole document (8 pages).
F.L. Muller, et al., "Aggregation of energetic flexibility using Zonotopes", 2015, 54th IEEE Conference on Decision and Control (CDC), Osaka, 2015, pp. 6564-6569.doi: 10.1109/CDC.2015.7403253 (Year: 2015).
M. Althoff, "formal and Compositional Analysis of Power Systems Using Reachable Sets," in IEEE Transactions on Power Systems, vol. 29, No. 5, pp. 2270-2280, Sep. 2014.doi: 10.1109/TPWRS.2014.2306731 (Year: 2014).
List of IBM Patents or Patent Applications Treated as Related, Dec. 2019, 2 pages.
Japanese Examination Report, JP Patent Application No. 2019-547152, dated Jun. 29, 2021, 3 pages.

* cited by examiner

UNCERTAINTY-FLEXIBILITY MATCHING ENGINE FOR INTER-TEMPORAL ELECTRIC ENERGY PRODUCTS

CROSS-REFERENCE TO RELATED APPLICATION

This application is a divisional of U.S. patent application Ser. No. 15/454,124, filed Mar. 9, 2017.

FIELD OF TECHNOLOGY

The present invention relates to electric power grids and electric energy production and consumption systems in the presence of uncertainty. In particular, the present invention relates to sensor-controlled electric energy production and demand.

BACKGROUND OF THE INVENTION

Electric power grids face several challenges. Variability and uncertainty in demand and supply can create a mismatch that causes a loss of efficiency, system failures, and wasted resources. This mismatch can arise from the variability and uncertainty that exists in present renewable energy production and in consumer demand. For example, solar and wind power generation are both weather dependent. While predictions can be made, there still remains a significant amount of uncertainty. On the other side, energy demand is also not fully known ahead of time as heating and cooling loads, for instance, are affected by weather or other events. As the share of renewable energy in the power grid grows, total energy generation and consumption become less predictable.

Furthermore, current trends point to an increase in decentralized production. Electricity generation may become more distributed and energy may be produced in smaller amounts at each generating unit. Consumers and businesses may add more solar panels at or near their point of use. In addition, power companies may add smaller, fast reacting, gas-powered turbines to react to fluctuating demand, and these turbines may be placed in distributed locations throughout the grid to help with demand.

Because the electric power grid can neither store, nor absorb or generate electric energy, a continuous balance between energy in- and outflow is required for reliable and safe operation. Without proper balancing, there can be a lack of energy supply at one time, or an oversupply at other time, leading to undesired deviations from nominal grid frequency and voltage, to grid congestion, and damage to power system equipment.

In the current electricity markets, only products to hedge against uncertainty of price, such as options and futures, exist. There are currently no products known that incorporate uncertainty of volume. Thus, no known products address the changes in supply of and demand for electricity.

Current methods for addressing these issues rely on grid-reinforcement, demand-response, and multi-stage markets. Grid-reinforcement includes upgrading transformers and power cables. However, while these measures are reliable they require additional infrastructure and, thus, are exceedingly costly and time-consuming. Demand-response programs, such as providing variable energy pricing, are simple, cheap, and distributed but are unreliable as the price elasticity of the energy consumers is unknown. Multi-stage electric energy and power markets are a known solution that is reliable. However, these approaches only work for controllable generation, are complex, have limited offerings, and are only available to transmission system operators. Furthermore, demand-response and multi-stage markets are reactive and unable to address problems until they occur.

There exist flexibility market prototypes such as iPower, PowerMatcher, and UFLEX. However, many of these market prototypes allow only restrictive flexibility products and do not consider inter-temporal constraints.

What is needed is a system that can match uncertainty with flexibility.

SUMMARY OF INVENTION

According to exemplary embodiments existing markets are extended by providing a single market for electric energy and power products. The system matches uncertainty by flexibility ahead of time and, thus, can proactively hedge against uncertainty by reserving a sufficient amount of flexibility. Furthermore, the system exploits the fact that many systems feature energetic flexibility, which has been traditionally ignored. In contrast to contemporary reserve markets for transmission system operators, the proposed system is open to anyone wishing to hedge their uncertainty by flexibility. Moreover, additional market participants can be brought in, as many types of small-scale distributed systems, such as heating and cooling systems and plug-in electric vehicles, feature some energetic flexibility. The system uses a quantitative description of flexibility and uncertainty and allows for products to trade flexibility and uncertainty including inter-temporal constraints.

In an embodiment, a smart grid energy system comprises a matching engine operatively connected to the at least one electric energy generator and the at least one electric load over a computer communication network and programmed to receive, over the computer communication network, a quantitative measure of uncertainty from the generator, where the generator comprises an uncertain rate of energy generation, receive, over the computer communication network, a quantitative measure of flexibility from the electric load, where the load comprises a flexible rate of energy consumption, generate a time-dependent control signal where the control signal is based on a zonotope mapping using the quantitative measure of uncertainty and the quantitative measure of flexibility, and transmit the time-dependent control signal to the load to modify rate of energy consumption.

In a further embodiment, a method of matching uncertainty in energy production and/or consumption with flexibility in energy production and/or consumption comprises receiving at least one flexibility offer from at least one flexible energy unit, where the flexible energy unit is configured to generate and/or consume electric energy, receiving at least one flexibility request from at least one uncertain energy unit, where the uncertain energy unit is configured to generate and/or consume electric energy, clearing the at least one flexibility offer and at least one flexibility request, performing an assignment of potential realizations of the uncertain electricity generation and/or consumption to corresponding control signals for the electric energy generation and/or consumption of the at least one flexible energy unit, receiving at least one electric energy measurement for a first at least one interval of a delivery period from the at least one uncertain energy unit, and transmitting at least one control signal value for a second at least one time interval of the delivery period to the at least one flexible energy unit based on the assignment.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Figure 1A:
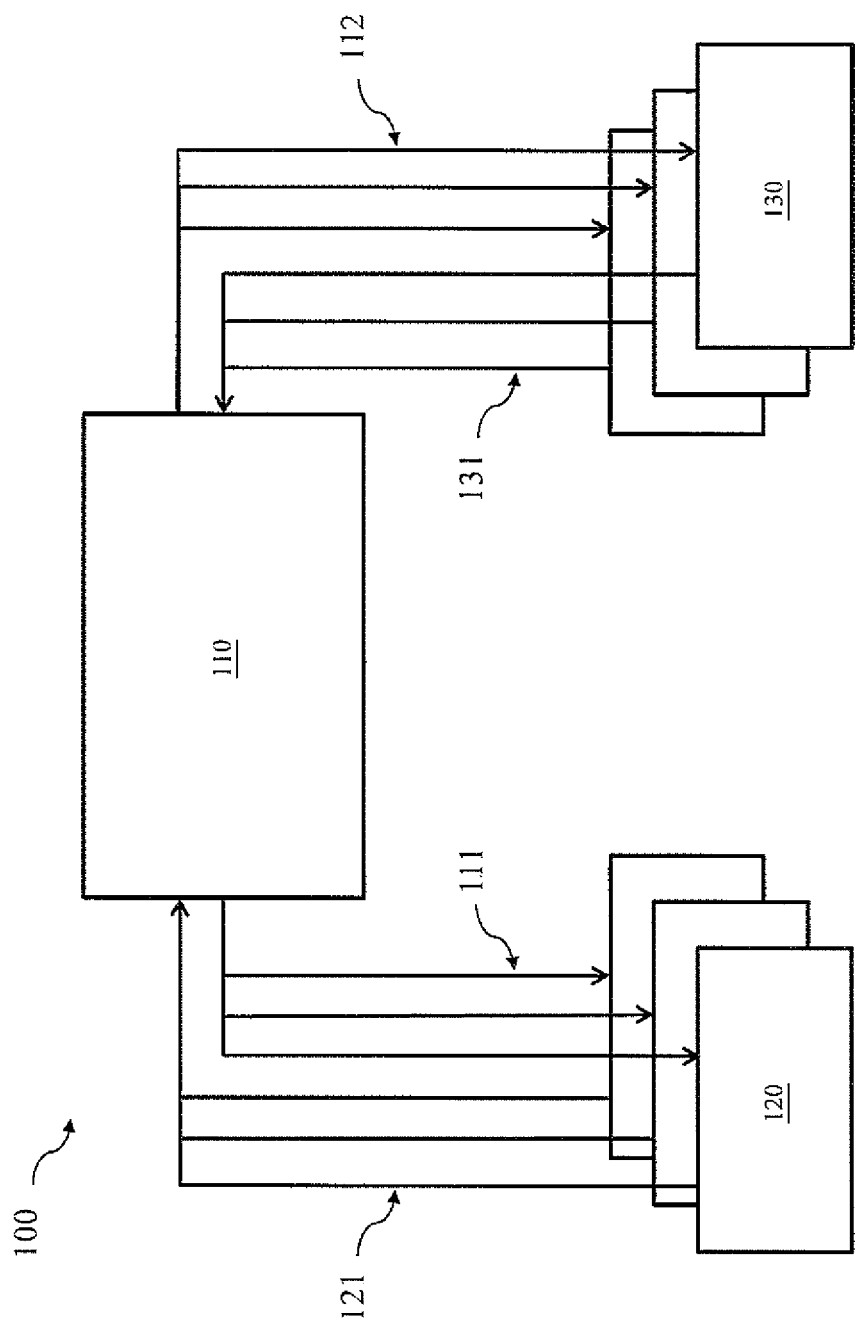
FIG. 1A illustrates a system diagram of the matching engine and the electric energy systems connected to it, according to an embodiment of the present invention.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

The system, in an embodiment provides compensation of uncertainty in electric energy generation and/or consumption with flexibility in electric energy generation and/or consumption. On the one hand, renewable energy sources such as solar and wind power plants are subject to significant uncertainty. Their exact power generation is unknown ahead of time and controllable only to some extent. On the other hand, many existing electric energy systems are flexible in their electric energy generation and/or consumption. For example, thermal power systems can adjust their output. HVAC systems have thermal energy buffers that allow deferral of consumption. Batteries and plug-in electric vehicles have chemical energy batteries that can act as buffers to shift demand/supply. Hydro storage power stations create potential energy buffers from pumping water in reservoirs. However, in order to use the energetic flexibility available, a quantitative description thereof is required.

As used herein, the energetic 'flexibility' refers to the ability of a system to adjust the volume and/or timing of its electric energy intake from or its energy output to the power grid. A buyer of a flexibility offer has the right, but not the obligation, to ask from the seller of the flexibility offer to implement any electric power trajectory in the flexible set specified in the offer. The seller of the flexibility offer has the corresponding obligation to implement any electric power trajectory asked for by the buyer. In this sense, a flexibility offer resembles a financial option. However, the big difference is that a flexibility offer is an option with regard to the volume of the commodity traded (electric power/energy) and not with regard to the price.

According to an example embodiment, both energetic uncertainty and energetic flexibility of systems are captured by zonotopic sets. The reasons for choosing zonotopes and their advantages are described below.

An example embodiment is able to match uncertainty by flexibility and thereby able to compensate for any realization of the uncertainty. The system comprises an uncertainty-flexibility matching engine that matches flexibility offers and requests, collects and handles information and contracting, sends out confirmation, activation and control signals, verifies appropriate delivery of traded products, and executes all the accounting/billing.

FIG. 1 illustrates a block diagram of an example system 100, in accordance with exemplary embodiments. In the example shown in FIG. 1, the system 100 includes an uncertainty-flexibility matching engine 110 that is connected via a communication network to uncertain systems 120, such as energy systems having energy resources that are subjected to some degree of uncertainty. The matching engine 110 may also be connected to flexible systems 130, such as electric energy systems whose energy generation and/or consumption is to some degree flexible. The matching engine 110 may then match flexibility requests 121 and flexibility offers 131. This allows electric energy generation or consumption units 120, 130 to trade electric energy and power and to proactively hedge against expected uncertainty ahead of time.

One or more uncertain systems 120 may, for example, submit the flexibility requests 121 for a predefined time of delivery to the matching engine 110. A flexibility request 121 for a given time interval may include i) a quantitative description of the uncertainty in electric energy generation and/or consumption to be compensated by flexibility, and ii) the maximum price the owner of the uncertain system 120 is willing to pay for flexibility. The uncertainty sets may be captured by zonotopes. Alternatively, the one or more uncertain systems 120 may submit historic electric energy measurements or a probability density estimate of the uncertainty together with a confidence level and a maximum price. Based on this information, the matching engine 110 can generate the corresponding zonotopic flexibility request. The one or more uncertain systems 120 may include, for example, wind turbine generators, solar power generators, or other power producers or consumers subject to uncertainty.

One or more flexible systems 130 may submit flexibility offers 131 to the matching engine 110. Flexible systems 130 may include, for example, electric vehicle chargers, electric heaters, or other power producers or consumers having flexibility. A flexibility offer 131 for a given time interval may include i) a quantitative description of the energetic flexibility the unit can provide, and ii) a cost function that assigns minimum prices to any subset of the flexibility submitted. The flexibility sets may be captured by zonotopes. Alternatively, one or more flexible systems 130 may subscribe to a flexibility identification program. In this case, the flexible system 130 provides, for example, electric energy measurements to the matching engine 110 over a predefined time duration. In addition, the flexible system may receive control signals 112 from the matching engine 110. For example, a control signal may include one or more timed reference power values that may be used by the flexible unit to determine its electricity consumption or generation. This way, the flexibility of the flexible system 130 may be identified autonomously (e.g. without user interaction) and appropriate future flexibility offers 131 can be generated upon request. Similar to existing electricity markets, in some embodiments the matching engine 110 may accept flexibility requests 121 and flexibility offers 131 for a particular time of delivery up to a certain submission deadline. After this deadline, the matching engine 110 matches the flexibility requests 121 and flexibility offers 131 in an economically optimal way based on the potential realizations. Details of the matching procedure are discussed in more detail below. After the matching has finished, the uncertain systems 120 are sent a notification 111 of whether or not their flexibility requests 121 have been matched. Similarly, flexible systems 130 are sent a notification 112 indicating, for example, whether their entire flexibility, subsets thereof, or none of their flexibility has been matched. The matching engine 110 keeps track of the found matching and sets up corresponding contracts between sellers and buyers of flexibility. During time of delivery, the uncertain systems 120 provide electric energy measurements to the matching engine 110, and the matching engine 110 translates them into control signals 112 assigned to contracted flexible systems 130. A detailed description of the information flow before and after the matching procedure, as well as during time of delivery and for ex-post accounting, is given below.

Figure 1B:
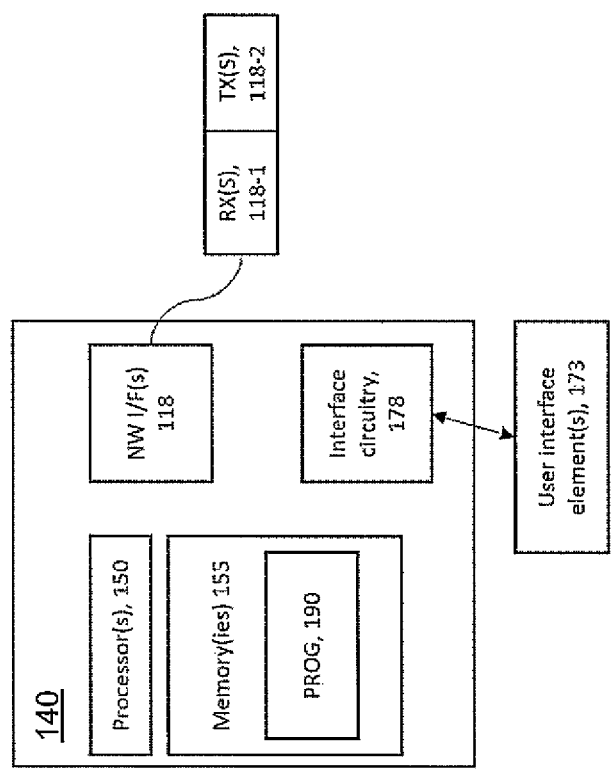
FIG. 1B is a simplified block diagram of an example apparatus in accordance with exemplary embodiments.

Referring now to FIG. 1B, this figures illustrates a simplified block diagram of various electronic devices and apparatuses that are suitable for use in practicing the exemplary embodiments described herein. For example, one or more of systems 120, 130, and 110 may comprise computer 140. The computer 140 includes a controller, such as a computer or a data processor(s) 150 and a computer-readable memory or medium embodied as a memory(ies) 155 that stores a program of computer instructions (PROG) 190.

The PROG 190 includes program instructions that, when executed by the associated processor(s) 150, enable the various electronic devices and apparatuses to operate in accordance with exemplary embodiments. That is, various exemplary embodiments may be implemented at least in part by computer software executable by the processors 150 of the computer 140, or by hardware, or by a combination of software and hardware (and firmware).

The memory(ies) 155 may be of any type suitable to the local technical environment and may be implemented using any suitable data storage technology, such as semiconductor based memory devices, flash memory, magnetic memory devices and systems, optical memory devices and systems, fixed memory, and removable memory. The processor(s) 150 may be of any type suitable to the local technical environment, and may include one or more of general purpose computers, special purpose computers, microprocessors, digital signal processors (DSPs), and processors based on a multicore processor architecture, as non-limiting examples.

In this example, the computer 140 also comprises one or more network (N/W) interfaces (I/F(s)) 118, interface circuitry 178, and may include or be connected to interface elements 173. A server, depending on implementation, may only be accessed remotely (e.g., via a N/W IF 118), and as such would not use the interface elements 173, which could include a display, keyboard, mouse, and the like. It is also noted that a "computer system" as this term is used herein may include multiple processors and memories, e.g., in a cloud-based system.

The NW I/F(s) 118 may be wired and/or wireless and communicate over the Internet/other network(s) via any communication technique. In this example, the NW I/F(s) 118 comprise one or more transmitters 118-1, and one or more receivers 118-2. Such transmitters 118-1 and receivers 118-2 can be wireless radio frequency (RF) transmitters or receivers supporting, e.g., cellular or local or wide area network frequencies and protocols. The transmitters or receivers may also be wired and support wired protocols such as USB (universal serial bus), networks such as Ethernet, and the like. There may also be a combination of these protocols used.

Figure 2A:
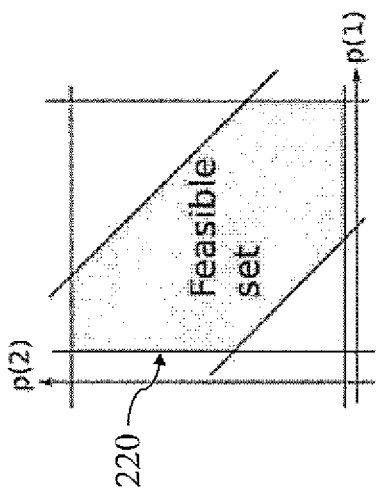
FIG. 2A illustrates a probability density plot of the uncertainty that an electric energy system might expect for a given future time interval, according to an embodiment of the present invention.
Figure 2B:
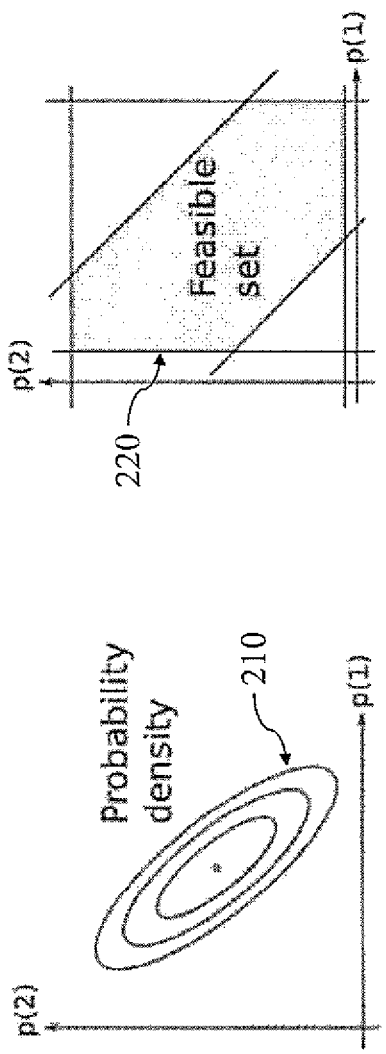
FIG. 2B illustrates the set of feasible discrete-time power trajectories that a flexible system can follow, according to an embodiment of the present invention.

FIG. 2A illustrates a probability density plot 210 of the uncertainty that a system might expect with regard to power consumption or generation, according to an example embodiment. Shown are only the first two time steps of a discrete-time planning horizon that can comprise an arbitrary finite number of time steps. FIG. 2B illustrates the set of feasible power trajectories a system can follow during a given planning horizon, according to an embodiment of the present invention. Shown are only the first two time steps of a discrete-time planning horizon that can comprise an arbitrary finite number of time steps. This set is also referred to as the feasible set 220. Feasible sets are defined by all the constraints imposed on a power trajectory. Common types of constraints are constraints on power, energy, or power ramp rates.

Figures 3A, 3B:
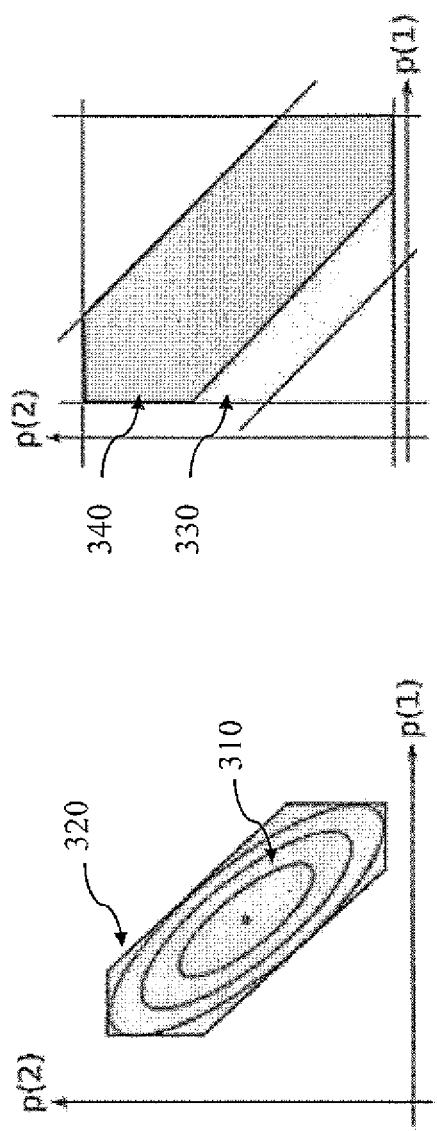
FIG. 3A illustrates how the expected uncertainty of a unit is outer-approximated by a zonotopic set, according to an embodiment of the present invention.
FIG. 3B illustrates how the feasible set available from a flexible unit is inner-approximated by a zonotopic set, according to an embodiment of the present invention.

FIG. 3A illustrates how a certain mass of the probability density 310 modeling the uncertainty is captured within a zonotopic set 320, according to an embodiment of the present invention. If the system subjected to this uncertainty wishes to hedge against this amount of uncertainty, it may submit the zonotope 320 as a flexibility request to the matching engine. FIG. 3B illustrates how a feasible set 330 of a flexible system is inner-approximated by a zonotopic set 340, according to an embodiment of the present invention. The flexible system can then submit the zonotope 340 as a flexibility offer to the matching engine. In FIG. 3A and FIG. 3B, the approach of this disclosure is used to describe both uncertainty and flexibility by zonotopes. The uncertainty-flexibility matching engine can be used to check if the flexibility request shown in FIG. 3A can be matched by the flexibility offer in FIG. 3B. In the case shown here, the uncertainty zonotope 320 can be matched with the flexibility zonotope 340 available because the flexibility zonotope fully covers the uncertainty zonotope.

Figure 4:
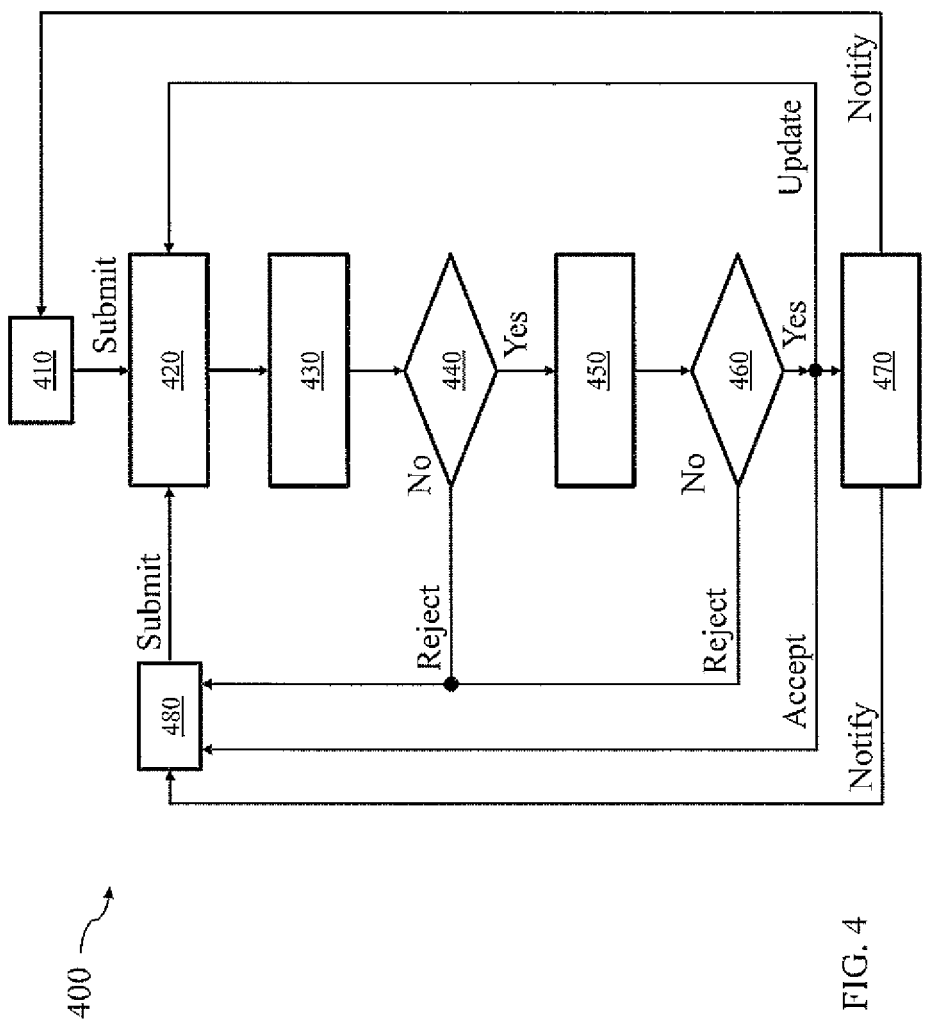
FIG. 4 illustrates a process flow for a clearing procedure, according to an embodiment of the present invention.

FIG. 4 illustrates a process flow 400 for a clearing procedure, according to an embodiment of the present invention. Flexibility offers 410 and flexibility requests 480 are submitted to an ordered pool 420 of flexibility offers and requests. The clearing procedure goes through the list of flexibility requests 480 and checks whether or not they can be matched by one or a combination of multiple flexibility offers 410. The clearing procedure is a two-step approach: First, matching with regard to deviations from baselines is checked 430. This corresponds to clearing a regulation power market. However, products with inter-temporal constraints, such as constraints on energy or power ramp rates, can be included. Successful matching in this first step 430 is a necessary condition for clearing a flexibility request. Thus, if matching is not possible, the request is rejected 440. Second, matching with regard to baselines is checked 450. This corresponds to clearing traditional electric energy markets. If and only if a matching is possible in deviations 440 and baselines 460, the flexibility request is matched successfully. A notification of acceptance is sent to the buyer 480 of flexibility offer and the matched flexibility offers and requests are removed from the flexibility pool 420. Contracts 470 are set up between the buyer 480 and one or many providers 410 of flexibility offers.

In embodiments, the process flow for clearing the flexibility offers and requests may include the following steps. First, the at least one flexibility offer from at least one flexible unit (e.g. flexible system 130 in FIG. 1) and the at least one flexibility request from at least one uncertain unit (e.g. uncertain system 120 in FIG. 1) are ordered. The ordering can be performed based on submission time or based on a price in the at least one flexibility offer. Then, the matching conditions for flexibility offers and flexibility requests are checked. A contract between matched buyers of flexibility and providers of flexibility is then set up. A routing table between matched buyers of flexibility and providers of flexibility, where the table defines a realization of uncertain electricity use of the buyer of flexibility is also set up. The table is then transmitted to the at least one flexible unit.

Figure 5:
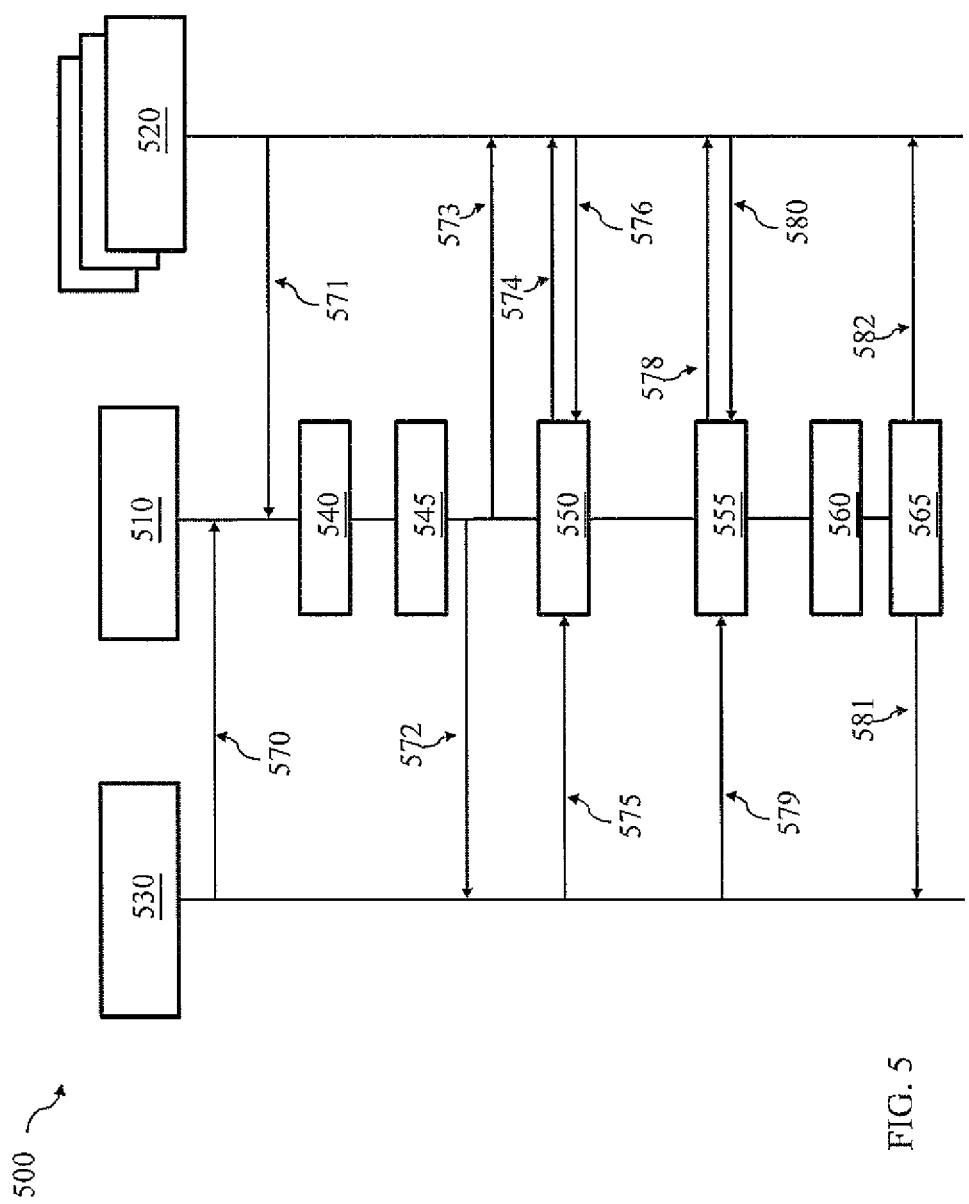
FIG. 5 illustrates a process timeline, according to an embodiment of the present invention.

FIG. 5 illustrates a process timeline 500, according to an embodiment of the present invention. An uncertain unit 530 (e.g. uncertain system 120) submits a flexibility request 570 to the matching engine 510 (e.g. matching engine 110). One or more flexible units 520 (e.g. flexible system 130) submit flexibility offers 571 to the matching engine 510. The matching engine 510 extracts a quantitative measure of uncertainty from the flexibility request 570 and extracts a quantitative measure of flexibility from the flexibility offer 571. In embodiments, the flexible units 520 and uncertain units 530 may submit the quantitative measures directly themselves. At 540, the matching engine 510 matches flexibility requests 570 and offers 571 according to the procedure described above and illustrated in FIG. 4. If a flexibility request 570 can be matched by flexibility offers 571, contracts 545 are set up between the buyer of flexibility 530 and the one or many providers of flexibility 520. A notification 572 of acceptance is sent to the buyer of flexibility. The one or many selected providers of flexibility are also notified and their flexibility offers are updated 573 accordingly. The matching engine 510 sets up a routing table 550. The routing table 550 may be, for example, implemented as a mathematical function that maps measurements 575 of the uncertain electricity consumption or generation to individual control signals 574 that are assigned to the flexible systems 520. During time of delivery, the uncertain unit provides electric energy measurements 575 to the matching engine that then, based on the routing table 550, assigns control signals 574 to each contracted flexible unit 520. The flexible units also provide electric energy measurements 576 to the matching platform for the purpose of verifying ex-post if the control signals have been implemented with sufficient accuracy. A forecast can also be submitted or broadcasted to the flexible units so as to predict likely future energy supply. This data exchange procedure is repeated for every time step of the delivery time interval, as summarized by 578, 579, 580, and 555. After the delivery interval, electric energy measurements of the flexible systems 520 are compared to their control signals 574, 578 in a verification procedure 560. Based on the amount of flexibility activated by the measurements 575, 579 and the result of the verification procedure 560, an invoice 581 is sent to the buyer of flexibility and reimbursements 582 are paid to the providers of flexibility 520.

In addition to the embodiment described in FIG. 5, it is possible to put some or all of the information exchanged 570-582 on a distributed ledger, e.g. a blockchain, and using smart contracts for one or more of the steps 540, 545, 550, 555, 560, 565. The distributed ledger will thus keep one or more multi-party trusted entries of flexibility offers; flexibility requests; baseline information; notification of acceptance/rejection; routing table; control signals; electric energy measurements; verification results; invoices and/or payments; and smart contracts for routing, verification, invoicing, and payments.

As part of the uncertainty-flexibility matching engine, a formal quantitative description of flexibility and uncertainty is required. This invention, in embodiments, uses zonotopes to describe both the flexibility and uncertainty of individual systems over a given finite discrete-time planning horizon, cf. FIG. 3. The main reasons for choosing zonotopes are the following. First, many flexible systems face power and energy constraints that lead to polytopic feasible sets. Zonotopes are a subclass of polytopes and can approximate well the feasibility polytopes that arise from such types of constraints. Second, zonotopes allow for a parameterized description, described below, that makes their aggregation computationally tractable. Third, in contrast to general polytopes, it is computationally tractable to check if a zonotope is included in the aggregation (the Minkowski sum) of a set of other zonotopes. In embodiments, checking these inclusion constraints is crucial to the matching engine.

A zonotope is defined as the set $Z(G, c, \bar{\beta}) := \{x \in \mathbb{R}^n : x = c + G\beta, -\bar{\beta} \leq \beta \leq \bar{\beta}\}$. It is completely determined by the generator matrix $G$ that contains the generator vectors as columns, the zonotope center $c$, and the symmetric bounds $\bar{\beta}$ on the generators.

Let $N(G)$ denote the matrix that contains as rows all the normal vectors of all possible facets of the zonotope generated by the generator matrix $G$.

Denote a zonotopic flexibility request by $Z_r(G, c_r, \bar{\beta}_r)$.

Denote a zonotopic flexibility offer as $Z_j(G, c_j, \bar{\beta}_j)$.

There exist different matching conditions that determine whether a given flexibility request can be matched by the set of available flexibility offers. In case the flexibility offers can only be matched entirely (integral), the matching condition is $\exists S \subseteq \Omega: Z_r \subseteq \oplus_{j \in S} Z_j$, where $\Omega:=\{1, \ldots, J\}$, with J denoting the number of available flexibility offers. The symbol $\oplus$ denotes the Minkowski sum.

In case the flexibility offers can be matched fractionally, the matching condition is $\exists S \subseteq \Omega: Z_r \subseteq \oplus_{j \in S} \hat{Z}_j, \hat{Z}_j \subseteq Z_j$, where $\Omega:=\{1, \ldots, J\}$, with J denoting the number of available flexibility offers.

Inclusion constraints of the form $Z_r \subseteq \oplus_{j \in S} Z_j$ are equivalent to checking the following set of inequalities:

$$0 \geq \left| N(G) \left( c_r - \sum_{j \in S} c_j \right) \right| + |N(G)G| \left( \bar{\beta}_r - \sum_{j \in S} \bar{\beta}_j \right).$$

Note that checking the above inclusion condition for general polytopic sets is not trivial and computationally expensive.

As an example, consider a wind power plant and a population of plug-in electric vehicles. The electric energy produced by the wind turbine can be forecast to some degree but will always be subject to uncertainty. Under the assumption that there is balance responsibility, the wind power plant operator has a strong incentive to make sure that all the energy produced can be sold, including unforeseen deviations from the forecast. For this reason, the wind power uncertainty is captured by a stochastic model and a zonotope is computed that includes 98% of all possible wind power realizations. Because the wind power plant operator wishes to hedge against this uncertainty, the zonotope is submitted as a flexibility request to the matching engine. On the other hand, there is a fleet of plug-in electric vehicles that exhibit flexibility in when to charge their batteries. However, there are constraints on the minimum and maximum energy content and the charging rate. The fleet operator would like to exploit this flexibility by submitting it as a zonotopic flexibility offer to the matching engine. If a matching can be found between the flexibility requested by the wind farm and the flexibility provided by the fleet of vehicles, a contract is set up that ensures that any potential power trajectory generated by the wind farm will be consumed by the fleet of electric vehicles. The operator of the vehicle fleet is reimbursed for the flexibility provided. The wind farm operator has to pay for the received flexibility but is not affected by any wind uncertainty anymore.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method of matching uncertainty in energy production with flexibility in energy production, the method comprising:
   receiving at least one flexibility offer from at least one flexible energy unit, wherein the flexible energy unit is configured to generate energy;
   receiving at least one flexibility request from at least one uncertain energy unit, wherein the uncertain energy unit is configured to generate energy;
   clearing the at least one flexibility offer and at least one flexibility request;
   performing an assignment of potential realizations of the uncertain electricity generation to corresponding control signals for the electric energy generation of the at least one flexible energy unit,
   receiving at least one electric energy measurement for a first at least one interval of a delivery period from the at least one uncertain energy unit; and
   transmitting at least one control signal value for a second at least one time interval of the delivery period to the at least one flexible energy unit based on the assignment.

2. The method of claim 1, wherein the first at least one interval and the second at least one interval correspond to the same time interval.

3. The method of claim 1, further comprising:
   receiving at least one electric energy measurement for a third at least one interval of the delivery period from the at least one flexible energy unit.

4. The method of claim 3, wherein the first at least one interval and the third at least one interval correspond to the same time interval.

5. The method of claim 1, further comprising:
   computing an electric energy forecast and broadcasting the forecast to the at least one flexible energy unit so as to predict likely future energy supply.

6. The method of claim 1, wherein clearing the flexibility offers and requests comprises:
   ordering the at least one flexibility offer from at least one flexible unit and the at least one flexibility request from at least one uncertain unit;
   checking the matching conditions for flexibility offers and flexibility requests;
   setting up a contract between matched buyers of flexibility and providers of flexibility;
   setting up a routing table between matched buyers of flexibility and providers of flexibility, wherein the table defines a realization of uncertain electricity use of the buyer of flexibility; and
   transmitting the table to the at least one flexible unit.

7. The method of claim 6, wherein ordering is performed based on submission time.

8. The method of claim 6, wherein ordering is performed based on a price in the at least one flexibility offer.

9. A method of matching uncertainty in energy consumption with flexibility in energy consumption, the method comprising:
   receiving at least one flexibility offer from at least one flexible energy unit, wherein the flexible energy unit is configured to consume energy;

receiving at least one flexibility request from at least one uncertain energy unit, wherein the uncertain energy unit is configured to consume energy;

clearing the at least one flexibility offer and at least one flexibility request;

performing an assignment of potential realizations of the uncertain electricity consumption to corresponding control signals for the electric energy consumption of the at least one flexible energy unit, receiving at least one electric energy measurement for a first at least one interval of a delivery period from the at least one uncertain energy unit; and transmitting at least one control signal value for a second at least one time interval of the delivery period to the at least one flexible energy unit based on the assignment.

10. The method of claim 9, wherein the first at least one interval and the second at least one interval correspond to the same time interval.

11. The method of claim 9, further comprising:

receiving at least one electric energy measurement for a third at least one interval of the delivery period from the at least one flexible energy unit.

12. The method of claim 11, wherein the first at least one interval and the third at least one interval correspond to the same time interval.

13. The method of claim 9, further comprising:

computing an electric energy forecast and broadcasting the forecast to the at least one flexible energy unit so as to predict likely future energy supply.

14. The method of claim 9, wherein clearing the flexibility offers and requests comprises:

ordering the at least one flexibility offer from at least one flexible unit and the at least one flexibility request from at least one uncertain unit;

checking the matching conditions for flexibility offers and flexibility requests;

setting up a contract between matched buyers of flexibility and providers of flexibility;

setting up a routing table between matched buyers of flexibility and providers of flexibility, wherein the table defines a realization of uncertain electricity use of the buyer of flexibility; and transmitting the table to the at least one flexible unit.

15. The method of claim 14, wherein ordering is performed based on submission time.

16. The method of claim 14, wherein ordering is performed based on a price in the at least one flexibility offer.

17. A method of matching uncertainty in energy production and consumption with flexibility in energy production and consumption, the method comprising:

receiving at least one flexibility offer from at least one flexible energy unit, wherein the flexible energy unit is configured to generate energy or consume energy;

receiving at least one flexibility request from at least one uncertain energy unit, wherein the uncertain energy unit is configured to generate energy or consume energy;

clearing the at least one flexibility offer and at least one flexibility request;

performing an assignment of potential realizations of the uncertain electricity generation and consumption to corresponding control signals for the electric energy generation and consumption of the at least one flexible energy unit, receiving at least one electric energy measurement for a first at least one interval of a delivery period from the at least one uncertain energy unit; and transmitting at least one control signal value for a second at least one time interval of the delivery period to the at least one flexible energy unit based on the assignment.

18. The method of claim 17, wherein the first at least one interval and the second at least one interval correspond to the same time interval.

19. The method of claim 17, further comprising:

receiving at least one electric energy measurement for a third at least one interval of the delivery period from the at least one flexible energy unit.

20. The method of claim 17, further comprising:

computing an electric energy forecast and broadcasting the forecast to the at least one flexible energy unit so as to predict likely future energy supply.

* * * * *